W. C. FARRER.
CHAIN OR FLEXIBLE SAW.
APPLICATION FILED NOV. 17, 1915.

1,229,597.

Patented June 12, 1917.

UNITED STATES PATENT OFFICE.

WILLIAM CHARLES FARRER, OF SHEFFIELD, ENGLAND.

CHAIN OR FLEXIBLE SAW.

1,229,597. Specification of Letters Patent. Patented June 12, 1917.

Application filed November 17, 1915. Serial No. 61,984.

*To all whom it may concern:*

Be it known that I, WILLIAM CHARLES FARRER, a subject of the King of England, residing at Sheffield, England, have invented certain new and useful Improvements in Chain or Flexible Saws, of which the following is a specification.

This invention relates to chain or flexible saws, its object being to provide an improved and stronger construction.

As generally made heretofore the saw has been divided into a number of sections of saw-toothed parts, each bearing usually two or three teeth, and the sections have been connected together by a number of plates on each side, one saw-toothed part being pivoted to the adjacent ends of every two pairs of side plates.

According to the present invention, however, instead of these side plates, bent connecting links are employed which are of U-shape in transverse section and the bases of the saw-toothed parts are situated in the channels thus formed in the links where they are secured by rivets or the like. The saw-toothed parts which bridge the junctions between adjacent links are pivoted thereto, and in order to allow the required bending of the saw with the teeth inward, the bases of these saw-toothed parts are situated the requisite distance from the bend in the links or the ends of the bases of these pivoted saw-toothed parts are suitably rounded. The adjacent ends of the connecting links are preferably squared at the back of the saw and may act as stops limiting the bending of the saw when opening it out, the other corners of the links being rounded.

In the accompanying drawings:—

Like letters indicate like parts throughout the drawings.

Figure 2:
Fig. 2 is a transverse section of a connecting link.

In carrying out the present invention bent connecting links A are employed which are of U-shape in transverse section as shown in Fig. 2 and the bases of the saw-toothed parts B and C are situated in the channels so formed in the links A where they are secured by rivets or the like. Thus the links A straddle the saw-toothed parts B and C. The saw-toothed parts B which bridge the junctions between adjacent links are pivoted thereto as shown at D, while the other saw-toothed parts C are rigidly riveted in the channel of the links between the pivoted parts B. The rigid saw-toothed parts C may be dispensed with in some cases where a greater flexibility of the saw is required by making the links of correspondingly shorter length.

In order to allow the required bending of the saw with the teeth inward about all the pivots D, the bases of the saw-toothed parts B are situated the required distance from the bend in the links A or the ends of the bases of these pivoted saw-toothed parts B are suitably rounded as shown in the drawings or otherwise cut away. The adjacent ends of the links A are preferably squared at the back of the saw and, as shown in the construction illustrated in Fig. 1, may act as stops limiting the bending of the saw when opening it out, the other corners of the links A being rounded.

When a saw made according to the old pattern hereinbefore referred to was subjected to a side bending moment, the ends of the side plates were only prevented from giving by their own stiffness (which, in comparison with the leverage available in a saw of average length and in view of the circumstances of manufacture, could not be great) and by the heads of the rivets pivoting them to the connecting saw sections. This constituted a source of weakness, the rivet heads being very liable to be "started" or to give way. A saw constructed according to the present invention, however, is very much stronger, especially in resisting such a side bending moment, for in addition to the greatly increased stiffness of the connecting links A due to their shape and formation, the squared ends of the links will be in contact with one another when the saw is fully extended and will thus provide added resistance. By curving the other corners of the bent links A about the pivots D with the correct radius the edges thereof will always be in contact at the least upon a tangent common to the two adjacent curves.

Figure 1:
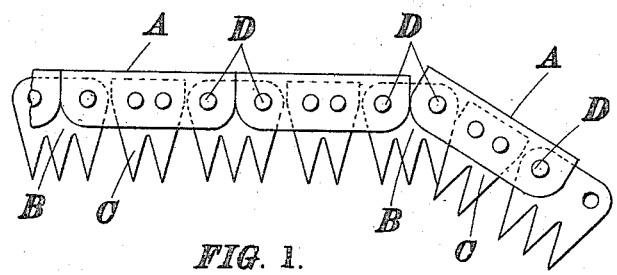
Figure 1 is an elevation of a chain or flexible saw according to this invention.
Figure 3:
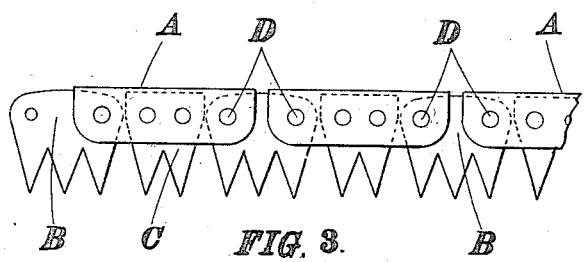
Fig. 3 is an elevation of a modification.

In the modification illustrated in Fig. 3 the stops limiting the bending of the saw when opening it out are not formed by the contacting squared ends of the links A as in the construction shown in Fig. 1, but by the contact of the bases of the pivoted saw-toothed parts B with the bend at the ends of the links A, these links being separated a slight distance from one another.

What I claim and desire to secure by Letters Patent is:—

1. A flexible chain saw comprising a plurality of links of U-form in cross section, a toothed member having its body inserted in and rigidly secured to each link, and an additional toothed member having its body embraced by and pivotally connected with two of the links.

2. A flexible chain saw comprising a plurality of toothed members, a link formed by a longitudinally bent blank extending across the edge of each of said members opposite that which is toothed and projecting over the faces of said member, means rigidly connecting each of said members to the embracing link, the link projecting beyond both ends of said member, an additional toothed member extending between two links and embraced by both thereof, and a pivotal connection between the last said member and each of the links into which it extends.

3. A flexible chain saw comprising a plurality of links each formed by a metal blank bent to provide two sides and a connecting back that extends throughout the length of said sides, a toothed member of less length than the link inserted between and rigidly secured to the sides of each link, and an additional toothed member embraced by two adjacent links and pivotally connected with both thereof.

In testimony whereof I affix my signature in presence of two witnesses.

WILLIAM CHARLES FARRER.

Witnesses:
JOHN M. SAVAGE,
ARTHUR H. GREENWOOD.

Copies of this patent may be obtained for five cents each, by addressing the "Commissioner of Patents, Washington, D. C."